United States Patent [19]

Buzard et al.

[11] Patent Number: 4,498,198
[45] Date of Patent: Feb. 5, 1985

[54] BINARY SIGNAL DECODING APPARATUS AND METHOD

[75] Inventors: Paul F. Buzard, Jefferson Borough; Robert J. Harrington, Duquesne, both of Pa.

[73] Assignee: Westinghouse Electric Corp., Pittsburgh, Pa.

[21] Appl. No.: 419,373

[22] Filed: Sep. 17, 1982

[51] Int. Cl.$^3$ .............................................. H03D 3/00
[52] U.S. Cl. .................................... 375/91; 329/110; 340/825.73; 375/88
[58] Field of Search ....................... 375/80, 82, 88, 91, 375/45; 371/36; 329/104, 110; 246/7, 125, 127; 307/510, 514, 516; 340/825.71, 825.73

[56] References Cited

U.S. PATENT DOCUMENTS 3,254,326  5/1966  Mann ..................................... 371/36
3,760,371  9/1973  Pitroda et al. ......................... 371/36
4,333,150  6/1982  Matty et al. ...................... 375/91 X

FOREIGN PATENT DOCUMENTS 2029170  3/1980  United Kingdom ................... 371/36

OTHER PUBLICATIONS

Jimerson, L. S. and Lewis, T. B., "Prevention of Computer Errors Due to External Transients", IBM TDB, vol. 3, No. 7, Dec. 1960, p. 24.

Primary Examiner—Robert L. Griffin
Assistant Examiner—Raymond Glenny
Attorney, Agent, or Firm—R. G. Brodahl

[57] ABSTRACT

An apparatus and method is provided for decoding a transmitted comma free coded signal, having a plurality of bits and two message frequencies, and suitable for application in controlling the passenger doors of a vehicle station. A sampling of the signal bits is made at a rate that is a multiple of the known transmission rate and a predetermined selection relationship is applied to make unnecessary the provisions of receiver synchronization apparatus responsive to the transmission rate control clock. This selection relationship involves summing the values of an odd plurality of sample points during a bit period and comparing this sum to a predetermined number to determine the binary value of the bit.

8 Claims, 8 Drawing Figures

BINARY SIGNAL DECODING APPARATUS AND METHOD

BACKGROUND OF THE INVENTION

In the prior art it was desired to transmit and receive six bit comma free coded word commands back and forth between a vehicle and a station. These word commands had to be synchronized, since the six bits of each coded word were sent in serial form one word after another word. If the comma free code for a given word happened to be 101111, the transmitter would send 101111, 101111, and so forth repeatedly. When decoding the word on either the station or the vehicle, the decoding had to be synchronized as disclosed in U.S. Pat. Nos. 3,562,712; 3,992,698 and 4,015,082 with a recovered transmission clock in relation to a particular word. The previous practice to indicate the beginning of each bit in a word was to reverse the phase of the bit. For each bit whether it changed from a one to a zero, a zero to a one or if there were two ones or two zeros, every 18th of a second the phase was reversed, as shown by U.S. Pat. No. 3,551,889. A sinewave signal of a first frequency is transmitted for a ZERO and a sinewave signal of a second frequency is transmitted for a ONE. Each phase reversal indicates the beginning of another bit of the six bit comma free coded signal. It was the prior art practice in the transit industry in relation to command signal transfer to recover the source clock information, along with the binary data, and to synchronize the signal decoder with the source clock information. A circuit was provided to detect this phase reversal to recover the source clock information. Each bit lasted 1/18 second, with a typical frequency of 8880 hertz for the ZERO code and frequency of 5920 hertz for the ONE code. It is known in the prior art, as discussed in a published article entitled "Design Techniques For Automatic Train Control", by R. C. Hoyler in the July, 1972 issue of the *Westinghouse Engineer*, to send out information signals from the transmitter at a station or on a vehicle in the 5 to 10 kilohertz range and which signals are received by a receiver at the other of the vehicle or the station, including hardware circuits that demodulate the signal into the form of digital data. The BART train control apparatus performed such an operation. The input signal to the receiver is in the form of a 5 to 10 kilohertz FSK frequency shift keyed comma free code signal, but the demodulator takes that signal and converts it into digital data including ones and zeros, as disclosed in U.S. Pat. No. 3,992,698. The signal level is about five or six volts when it is a ONE and zero volts when it is a ZERO. The input signal line is going to be going high and low representing the ONE and ZERO bit signals that are received continuously, and it is desired to know what the meaningful code signal is out of that data stream.

For the example of vehicle and station door control, it is desired to recover out of this received data stream the coded word information that was originally embedded in it by the station transmission to the vehicle. A typical door control system transmits from the station to the vehicle four command word bit patterns, namely to open alighting doors, to open boarding doors, to open both doors, and to close both doors. For this purpose, four different code word commands are transmitted to the vehicle, with the first code word command being to close all doors. Since there are doors on both sides of the car, this coded word command signal closes doors on both sides of the car. Whenever a car pulls into a station lobby, one side of the car and station is designated as alighting for people setting off and one is designated as boarding for people getting on. The people come in the car from one side and go off the car from the other side. The alighting doors are opened first, which means the people on the car will start to exit toward one side of the car because those doors open first, and after everybody starts moving out then the boarding doors are opened a few seconds later. In that way people move off the car and move on the car through the vehicle and station doors at the same time to speed up the people transfer process. Typically, signals are first sent to open alighting doors, then signals are sent to open both doors, and then signals are sent to close both doors. The station initially sends these signals to the vehicle and the vehicle in turn sends these same code signals back to the station.

There is provided a decoding apparatus and method to interpret a binary code pattern of ones and zeroes that does not need an additional signal at the receiver representing the clock frequency of the source originating the received signal command.

SUMMARY OF THE INVENTION

The input command signal code is supplied to the present signal decoder apparatus and method in the form of ones and zeros, representing the actual information data stream received from the source transmitter. With the approximate clock frequency of the source known, each bit of the incoming code signal is sampled at a multiple of the approximated frequency of the source clock rate to provide at least three samples of that bit. For the example of an 18 hertz clock frequency, an illustrative sampling multiple of 4.0 or 72 hertz is used in the following description.

Three of the four samples at the 72 hertz rate are added to each other, and the fourth sample is not considered. One of the first samples or the last sample can be discarded and the other three of the four samples can be summed. It is desired that an odd number of samples be summed, such that a majority of those samples will determine the value of the sampled input signal bit. If the sum of the three sample bits equals 2 or 3, the incoming data bit is declared a ONE. Otherwise, it is declared a ZERO. In either case, the sum is stored.

To provide accurate decoding without the source clock rate signal, if the first, second or third sample indicates a ONE and the current sample sum equals ZERO, then the one through four sample counter is reset to a count of one, regardless of its previous setting. This has the effect of synchronizing the decoding sampling process sample set to the rising edge of the first ONE bit received in each group of samples. The sampling of the data stream can be repeated for each data bit of the word command received. The decoded bit is stored in a shift register device which permits storage, comparison or manipulation of all or part of the decoded data stream.

In accordance with the present invention, the voltage of each bit of the received input signal is sampled by strobing at a 72 hertz rate with a pulse having a time duration substantially less than the time duration of the sample interval. Since the coded information is transmitted at an 18 hertz rate, a sample at the receiver is made at 4 times the information data rate.

PREFERRED EMBODIMENT OF THE INVENTION

The preferred embodiment of the invention discloses a signal decoding apparatus and method operative with a comma free binary coded command signal. One suitable aplication is shown in relation to station door control apparatus for a transit vehicle system.

Figure 1:
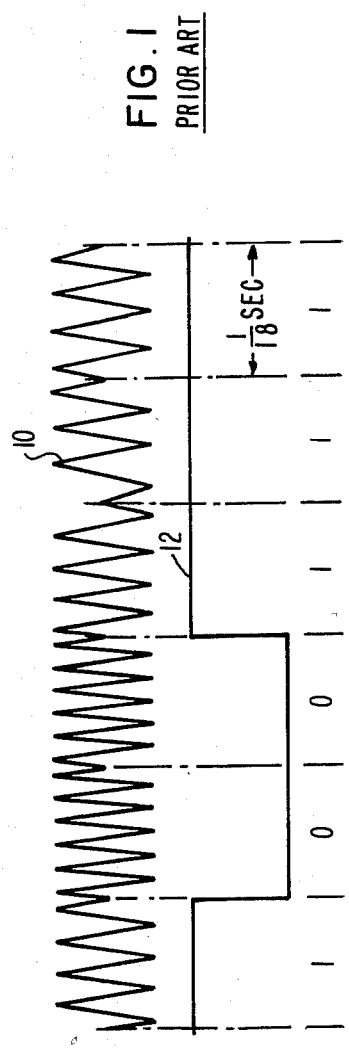
FIG. 1 shows an illustrative prior art signal waveform for a comma free coded word.

FIG. 1 shows a typical and well known frequency shift key modulation (FSK) waveform 10 for a comma free command signal word that has been utilized in the prior art for the control of transit system operations, such as illustrated in U.S. Pat. Nos. 3,551,889 and 4,015,082, the disclosures of which are incorporated herein by reference. The command signal word is shown as having six binary bit values, however, it is well known to provide more or less bits for a given signal word. The waveform 12 shows the corresponding binary signal values for each bit of the command signal word shown by curve 10.

Figure 2:
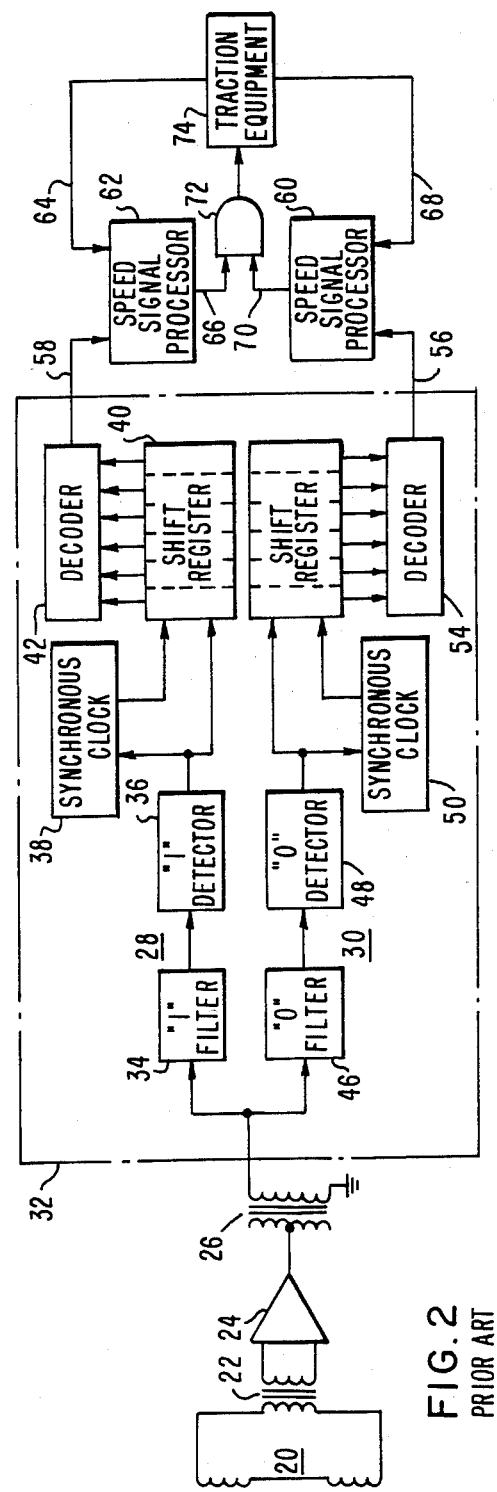
FIG. 2 shows a prior art binary signal decoding apparatus for a coded command word signal having two message frequencies.

In FIG. 2 there is shown a prior art binary signal decoding apparatus for a coded command word signal having two message frequencies, as disclosed in greater detail in U.S. Pat. Nos. 4,015,082. The binary coded message is comprised of 1 and 0 message words in which the 1's are transmitted at a first frequency and the 0's are transmitted at a second frequency. A coded command signal is sensed by an antenna 20 which is coupled through transformer 22 to a preamplifier 24. The preamplifier 24 is coupled through a transformer 26 to signal channels 28 and 30 of the multiple channel signal decoder 32. The signal channel 28 includes bandpass filter 34, threshold detector 36, synchronous clock 38, a storage shift register 40 and decoder 42. The bandpass filter 34 is tuned to the 1 frequency and the threshold detector 36 operates to detect the presence of a 1 frequency. The signal channel 30 includes bandpass filter 46 tuned to the 0 frequency, threshold detector 48, synchronous clock 50, a storage shift register 52 and decoder 54. Output signal lines 56 and 58 connect with respective signal processors 60 and 62, where the decoded command signals are compared with feedback signals. For the example of vehicle speed command signals as shown in U.S. Pat. No. 4,015,082, the actual vehicle speed feedback signal 64 is compared with the 1 frequency desired speed command signal 58 to determine a speed error 66, and the actual speed feedback signal 68 is compared with the 0 frequency desired speed command signal 56 to determine a speed error signal 70. If the error signals 66 and 70 are substantially the same, as compared in AND gate 72, the speed error signal is applied to control the vehicle traction equipment 74.

Figure 3:
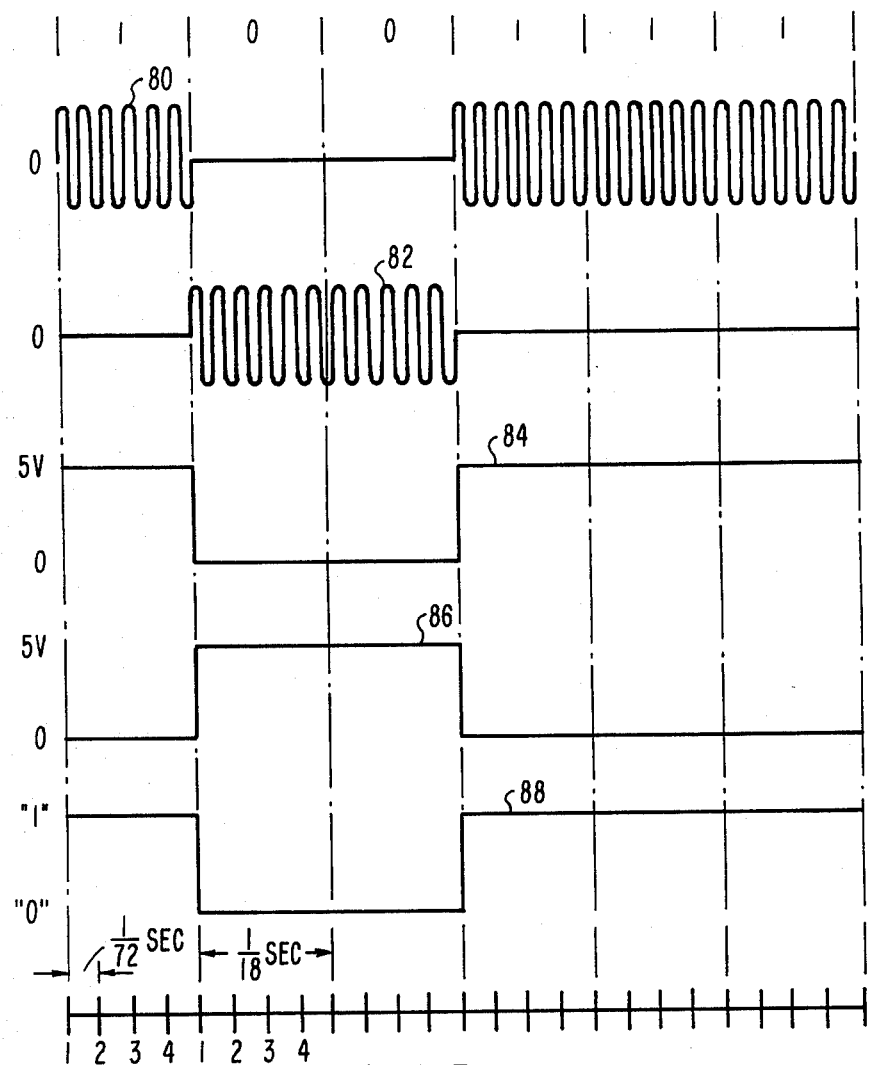
FIG. 3 shows signal waveforms to illustrate the output signals provided by the signal decoder apparatus of FIG. 2.

In FIG. 3 there is shown the output signal waveform 80 that is provided by the 1 frequency filter 34, and the output frequency signal waveform 82 is provided by the 0 frequency filter 46. The output binary signal waveform 84 is provided by the 1 frequency detector 36, and the output binary signal waveform 86 is provided by the 0 frequency detector 48.

Figure 4:
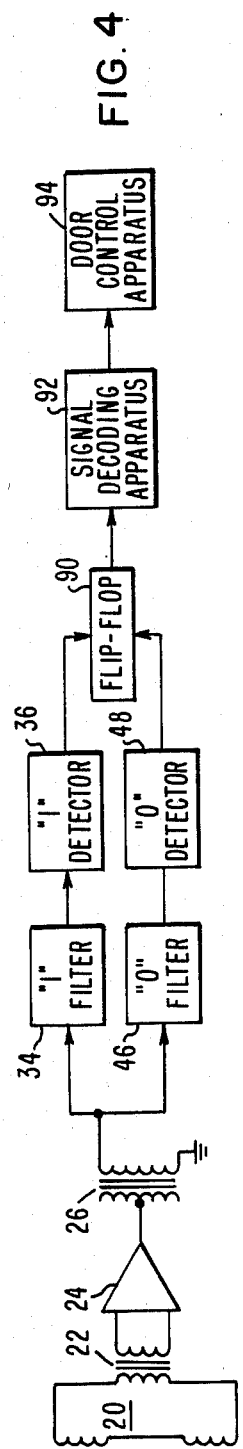
FIG. 4 shows the signal decoding receiver apparatus of the present invention applied in relation to a transmit vehicle system door control apparatus.

In FIG. 4 there is shown the signal decoding receiver apparatus of the present invention in an application for the control of passenger doors. This could typically be used for controlling the doors of a passenger station in relation to a transit vehicle arriving at that station and then leaving that station location.

Comma free command signals can be utilized for this purpose as follows:

100001 to open alighting door;
101010 to open boarding door;
100011 to open both doors;
100111 to close both doors.

In an article entitled "Atlanta Airport People Mover", by T. C. Selis that was published in the Conference Record for the 28th IEEE Vehicular Technology Group Meeting on Mar. 22, 1978, there is diagrammatically shown a typical door and dwell time control apparatus that is operative with both the vehicle passenger doors and the station lobby doors when a passenger vehicle arrives at a station location.

For the example of the six bit comma free command signal 100111 being provided to close the vehicle and the station lobby doors, the antenna 20 would sense this signal. In the station lobby door control application, the antenna 20 would receive this signal from a vehicle carried antenna. The 1 signal filter 34 would output the signal waveform 80 as shown in FIG. 3, and the 1 signal detector 36 would output the signal waveform 84. The 0 signal filter 46 would output the signal waveform 82 as shown in FIG. 3, and the 0 signal detector 48 would output the signal waveform 86. The signal waveforms 84 and 86 could have a high value of about 5 volts for each detected bit signal having respectively a 1 or 0 binary value as shown. A bistable circuit device, such as flip-flop 90, is connected to provide a high or 1 output signal in response to each high value of the signal 84 and to provide a low or 0 output signal in response to each high value of the signal 86. In this way the output signal waveform 88 shown in FIG. 3 is provided by the flip-flop 90 in response to the comma free command word 100111 that controls the closing of the station lobby doors on both sides of the passenger vehicle. The signal 88 is transmitted at a known frequency, such as 18 hertz. The signal decoding apparatus 92 operates to sample the voltage of each bit of the signal 88 at a predetermined multiple of the input signal frequency, such as four times 18 hertz or at a 72 hertz rate, to provide four samples to be taken for each transmitted signal bit. This timing relationship of the sample strobing is illustrated at the bottom of FIG. 3 for each of the six bits shown in that figure, to provide four equally spaced strobes 1, 2, 3 and 4 for every 1/18 second time interval of each bit of the transmitted signal 88. The decoded signal bits for each received command word are stored in a shift register to permit storage comparison or manipulation of all or part of the decoded data stream. The decoded output signal from the signal decoding apparatus 92 is applied to the well known door control apparatus 94, which can be similar to that shown in the latter published article.

Figure 5:
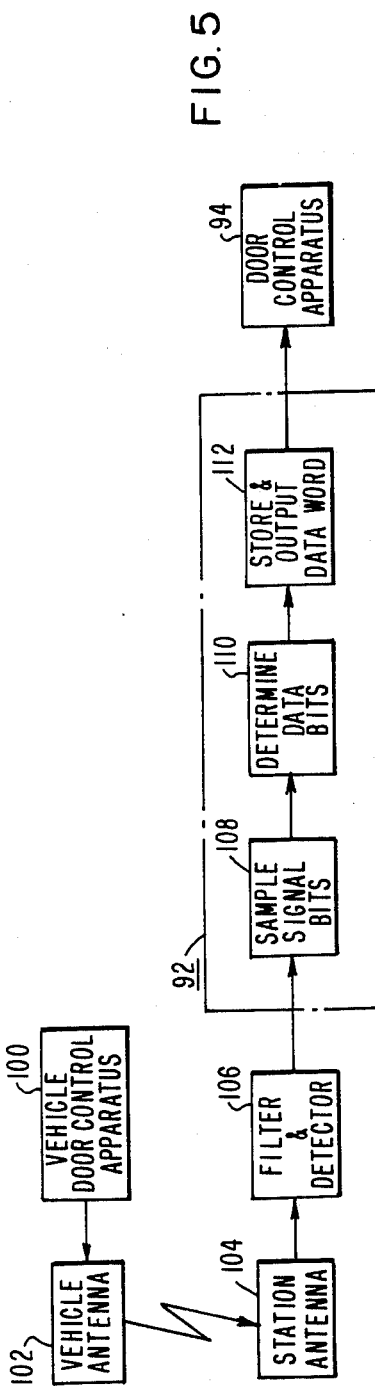
FIG. 5 shows the functional operation of the present signal decoding apparatus.

In FIG. 5 there is shown the functional operation of the present signal decoding apparatus. The door control command signal, such as shown in FIG. 3, is sent from the station to the vehicle when a passenger vehicle arrives at a station location. The vehicle then retransmits the door control command signal from the vehicle door control apparatus 100 through the vehicle antenna 102 back to the station antenna 104 for the control of the station lobby doors. The filter and detector 106 provides the command signal waveforms, such as shown in FIG. 3. The signal decoding apparatus 92 then samples the command signal bits of waveform 88 at functional block 108, determines the respective values of sampled data bits at functional block 110 and then stores and outputs the command signal data bits at functional block 112. The station door control apparatus 94 responds to the output command signal word, such as 100111 shown in FIG. 3 to close both station lobby doors on the respective sides of the passenger vehicle in the station location.

In FIG. 6 there is shown a program routine flow chart to illustrate the functional operation of the signal decoding apparatus 92 as shown in FIG. 5. The first part of the flow chart keeps track of the four samples taken for a given data bit, and a local 1 to 4 counter is incremented at a 72 hertz rate, to indicate when a sample set of four counts has been taken. After the data bit has been sampled four times, a determination is made based on a selected portion of these four samples to establish if the transmitted bit was a one or a zero. The program routine operates at a 72 hertz rate to sample the input data bit as determined by a local clock.

Figure 7:
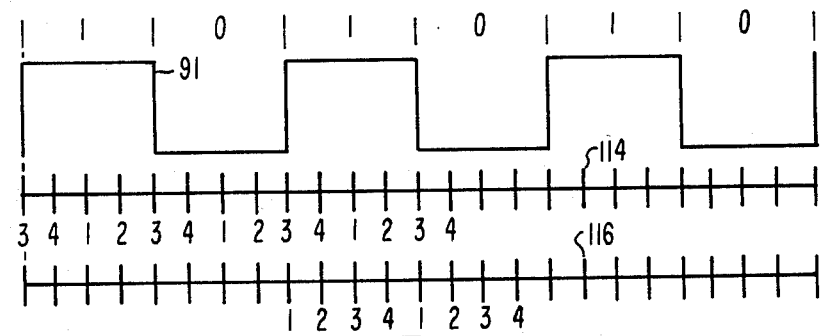
FIG. 7 shows a reset of the local clock to correct an undesired shift of the sampling operation.

The present sampling operation looks to see if a particular sample is a one and the previous samples in that sample set are zeros. For instance, if at the third of four samples a one is found, and the previous two samples were zeros, the program operates to reset the local counter to one to begin another sample set and to catch the rising edge of that one. The sampling operation will then start counting another three samples for a given signal bit, with the first sample being the last one that was just detected. This is done on a one, but only on the first one, in a particular sample set as shown in FIG. 7 in relation to the comma free input signal 101010, where the sampling operation shown by line 114 illustrates a situation where the local clock has shifted for some reason and improper determination of the signal bits shown by curve 89 might result. The curve 91 would be output by the flip-flop 90 for the comma free input signal 101010. This reset of the local counter results in the sampling operation beginning the sample set synchronized in time with the signal 91 as shown by line 116. On the other hand, if the sample operation samples four ones and then samples four zeros and then samples four ones, there is no need to shift the sample set, and there is similarly no need to shift when two ones and then two zeros are sampled. In addition, the present sampling after a set of four samples throws away the fourth sample. The determination process is to accumulate a set of four samples for a given input data bit, and on the basis of a majority of ones or a majority of zeros in the remaining three bits of that sample set, the particular input data bit at the 18 hertz rate is then declared either a one or a zero. At this point the declared bit is stored to build up a re-constructed six bit data word stream. If a set of four samples finds three zeros, this bit is declared a zero. If the three samples in a set are all ones, the bit is declared a one. In the event of two zeros and a one for the three samples of a set, that bit is declared a zero. For a sample set including two ones and a zero, that bit is declared a one.

There is no problem with using the four samples of a given set, if all four of them are ones, since that input data bit is a one. If three of the four samples in a sample set are ones, the bit is a one. A decision was made to use only three of the samples in a given set rather than all four samples, to avoid a problem that occurs when for a given sample set two samples are ones and two samples are zeros, since there is no certain way to declare the value of that bit. When only three samples are used to determine each input data bit, a majority of those samples will establish if the bit is a one or a zero. The local clock is the standard interrupt function of an Intel 8080 microprocessor, and an interrupt function is selected in this case at a 72 hertz rate.

Figure 6A:
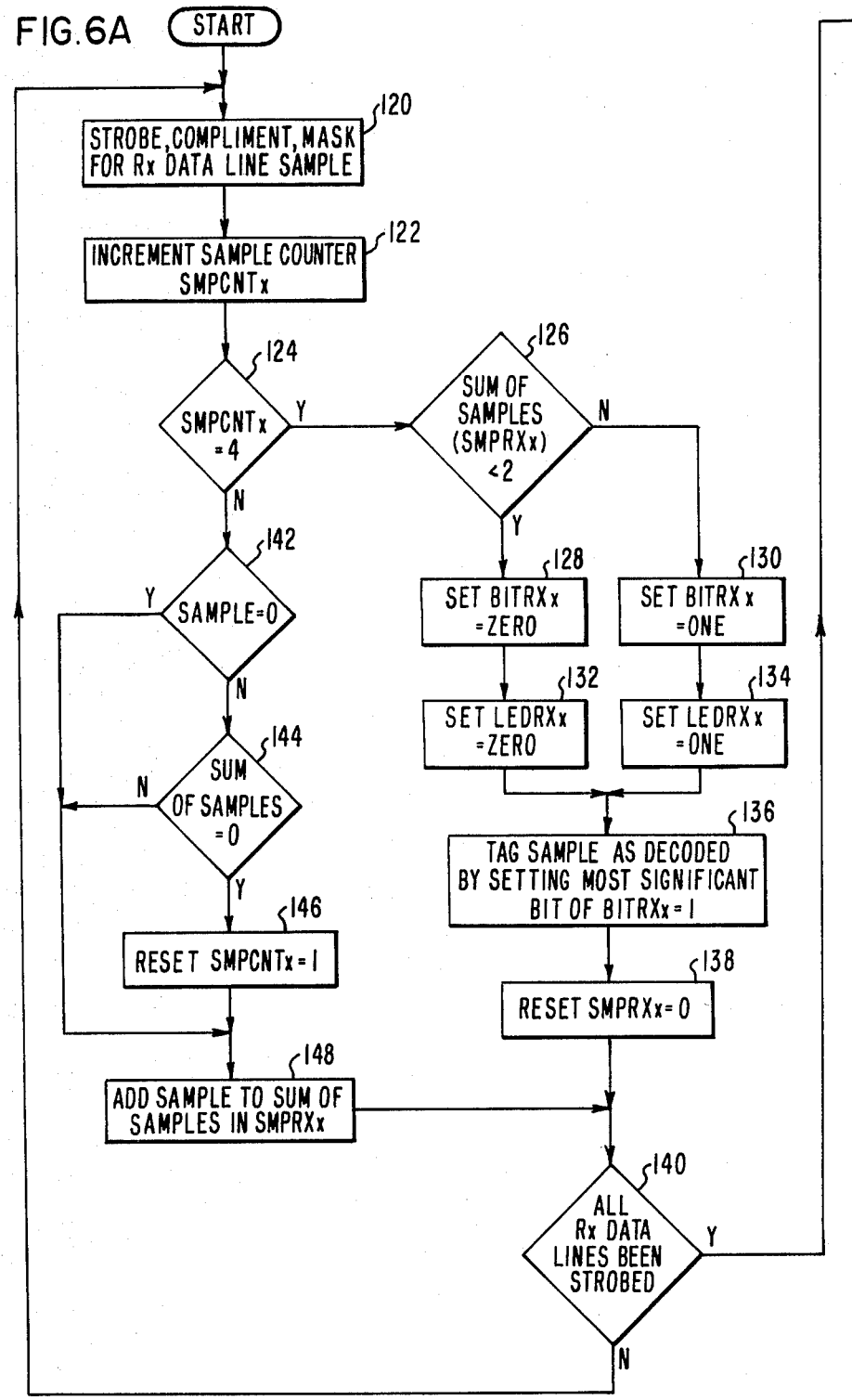
FIGS. 6A and 6B show a program routine flow chart to functionally illustrate the operation of the present binary signal decoder apparatus and method.
Figure 6B:
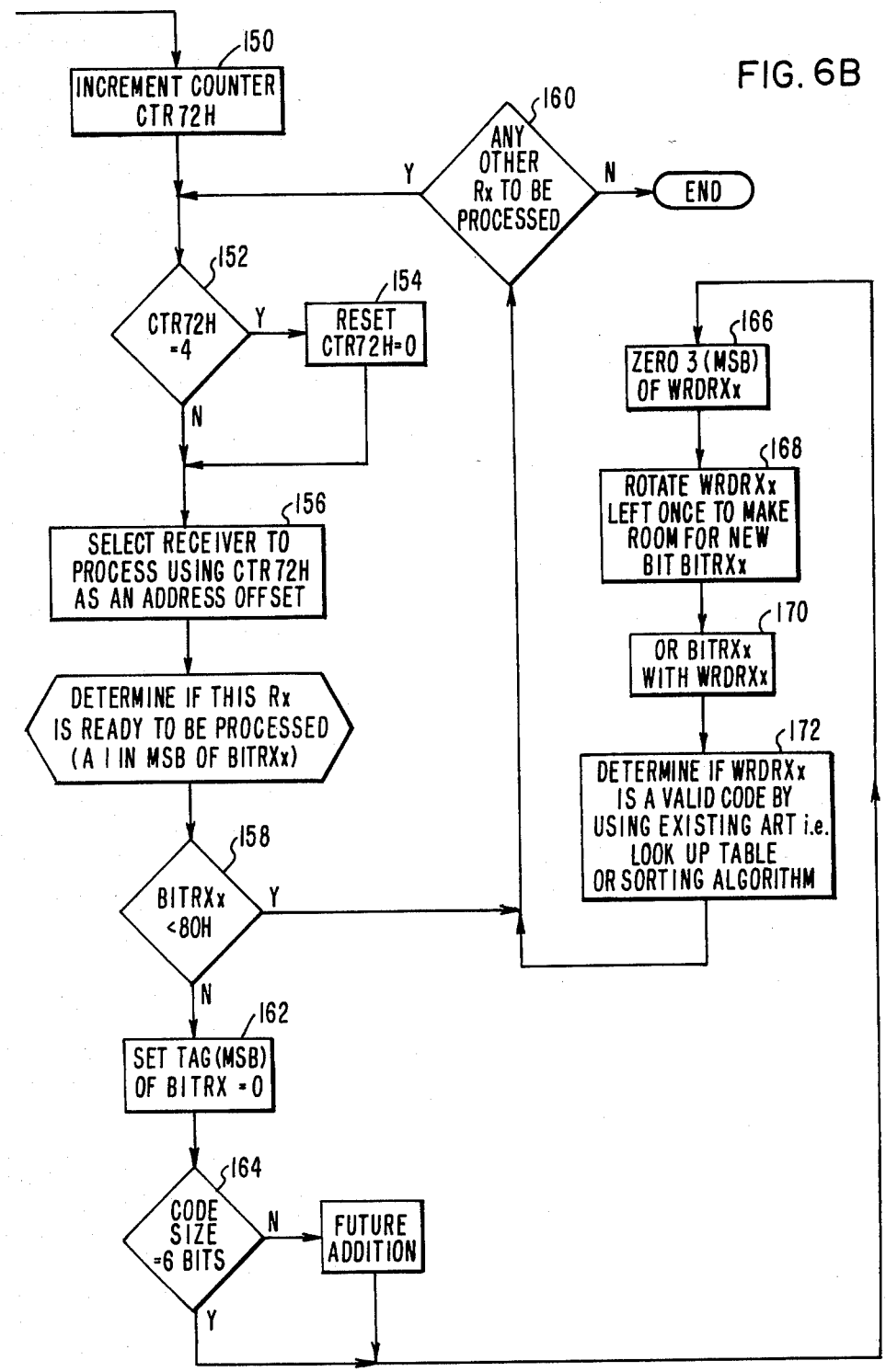

The flow chart shown in FIG. 6A and FIG. 6B illustrates the algorithm and logic processing of the command signal decoder apparatus of the present invention. The program operates at an interrupt clock driven rate. The flow chart block 120 is related to acquiring the sample data in relation to providing a strobe, compliment and mask for the receiver data line sample of the input signal. The program is going out to input data line supplied by the filter and detector 106 shown in FIG. 5 and looking at the input signal, which is stored as a snapshot of the data line at that time. At block 122 a sample counter is incremented, which counter is an individual counter in each of the several receiver inputs that can be processed since the program is written to process several receiver inputs if desired. For this description of the present invention, only one receiver input is processed. This one to four counter can be reset independently for each input data signal receiver. A typical train of passenger vehicles communicating with a station has more than one transmitter. For example, if there are two cars, there can be two transmitters and all of the input data comes to a common station signal decoder apparatus. The algorithm used to increment the sampling counter that is assigned to each receiver is determining whether this is sample count number four of a given sample set, because when the count equals four the program is going to determine for a sampled receiver data line if the sample set sum establishes a one or a zero data bit. If this is less than the fourth count, the sample is just stored to accumulate the samples in a particular sample set.

The program is running an accumulative sum within a particular range. If this is the first one sampled, it is desired to start the one to four count over again. When the count of four is reached for a given sample set, the program in effect discards the fourth sample by not storing it in the summation of samples. However, during that time of the fourth count, the program looks at the accumulative sum of the samples and determines if the sum is equal or greater than two, and if it is then the sampled bit is declared to be a one. Decision block 124 determines whether the program is at a sample count four or less than four. Block 126 operates when the program is at a sample set count of four to decide when the cumulative sample sum is one of equal or greater than two or less than two to declare the sampled data bit at the 18 hertz rate was a one bit or a zero bit. If it is equal to or greater than two, it is declared a one and anything less than two is declared a zero. Blocks 128 and 130 store just a one or a zero respectively based on the outcome of block 126. Blocks 128 and 130 provide a temporary storage location of the decoded bit until a later part of the program incorporates the contents of block 128 and 130 into existing data to re-construct the transmitted data word. Blocks 132 and 134 store just a one or a zero respectively for optional use by other programs or hardware that will energize an operator light on a panel to indicate the decoded bit is a one or a zero. Block 136 tags the decoded bit in this example by setting the most significant bit to one to indicate that a complete sample set has been achieved for the receiver input decoded bit. The decoded bit it tagged to facilitate separating the program functions of sampling and bit decoding from the program functions of data word decoding. Block 138 sets the storage location for the sum of the sample bits to zero in anticipation of the next sample set for the associated receiver input signal. Whenever the sample counter is less than four at block 124 the strobed receiver input data signal is tested to determine whether it is a one or a zero at block 142. If the signal is a zero the signal value is accumulated into the current sample set at block 148. If the signal is a one when tested at block 142 then the accumulated sample sum is also tested to determine if this is the first instance of a one value in the partial sample set at block 144. Whenever the partial sample set contains a value equal or greater than one, the input data signal having a value of one is accumulated in the current sample set at block 148. However, when the partial sample set at block 144 is zero the program resets the sample counter to a count of one at block 146, and then adds the input signal value to the sample set at block 148. The significance of resetting the sample counter to one is that it has the effect of re-calibrating the sample counter to the transmission clock rate each time the first one value is strobed in each sample set. Each valid comma free code contains at least a single one bit, therefore this counter is re-calibrated at a minimum of once each word interval.

At this point the sampling operations have been completed for a single receiver input and either the strobed input value has been stored in a partial sample set or the decoded sample bit has been tagged and stored re-constructing the data word later in the program. Block 140 provides a loop to sample a bit decode each receiver input data line in applications containing more than one receiver input. The next step is to re-construct the transmitted data word.

At block 150 of FIG. 6B a counter is incremented each time the program is called. The decision block 152 resets the counter to zero at block 154. For each sample set of four counts this counter is included to provide address offsetting when multiple receiver input signal lines are being processed. In applications containing only one receiver input this counter would not be necessary, nor would block 156, which selects the receivers to be processed on a cyclical basis; nor would block 160 which provides the capability of processing more than one receiver each time through the program.

The actual word decoding starts at block 158 which tests whether the decoded bit location of the associated receiver input has a complete sample set and also has not been processed by this section of the program. When the decoded bit contains a tag which was inserted at block 136 the bit will be processed, otherwise the processing will be omitted for this receiver input data on this pass through the program.

If the sample was tagged it indicates that it can be built into a six bit word. This most significant bit is not tagged for example, when the counter is reset to one because a one following some zeros had occurred. Since the loop from block 156 on is occurring at an 18 hertz rate, it could be thrown out of time or out of synchronization if it is not tagged, so to avoid this it will ignore further processing of this bit and wait until it is tagged, which happens at block 158 that goes to block 160 for skipping this intermediate phase. At block 162 a valid sample has been decoded, and the tag has to be removed because from this point on only the data bit is of interest. Block 164 is a decision block which is determining that the comma free code is a six bit word as compared to perhaps a future interest in a seven bit or eight bit command signal word. The present application uses a six bit code word.

Block 166 and following are related to taking the decoded bit and using it to construct a six bit comma free code word. Block 166 takes the previous six bits of information that are stored, and sets the three most significant bits to zero. Since a six bit comma free command signal word is involved with the available storage eight bits wide, the two most significant bits remain zero throughout this program. The hardware of the computer is eight bits and the desired code word is only six bits wide, so for bookkeeping purposes all of the locations worked with are eight bits wide and one assigned convention is that all of the desired six bit codes are going to occupy the least six bits in any location. Another convention is that unused locations are to be zero to facilitate using lookup tables with the decoded word, so block 166 will zero the three most significant bits, because since the present six bits represent old information the oldest data bit is thrown away and then the remaining five bits are moved over one to make room for the new data bit. Block 168 rotates the last five bits of data to make room for the most recent data bit in the least significant bit location. At block 170 the new data bit is ORed with the previous five data bits, and the OR function then creates a six bit comma free code that represents the data stream up to that point. Block 172 uses conventional and well known program operations to determine if the decoded data word in block 170 is a valid bit pattern. This application uses a sorting algorithm, however a lookup table can also be used. The decoded word and whether it is a valid code, are stored for use by other control programs known in the prior art to effect the desired door control in this application before this program is exited.

In the Appendix there is included an instruction program listing that has been prepared to control the signal decoding. The instruction program listing is written in the assembly language of the Intel 8080 microprocessor. Many of these microprocessors have already been supplied to customers, including technical instruction manuals and descriptive documentation to explain to persons skilled in the art the operation of the microprocessor apparatus. This instruction program listing is included to provide an illustration of one suitable embodiment of the present invention that has been developed. This instruction program listing at the present time has not been extensively debugged through the course of practical operation for the real time control of a signal decoding operation. It is well known by persons skilled in this art that most real time control application programs contain some bugs or minor errors, and it usually takes varying periods of actual operation time to identify and routinely correct the more critical of these bugs.

```
LOC  OBJ        LINE        SOURCE STATEMENT 1
                2           ; * MIAMI DPM *
                3
                4
                5           ; GENERAL DESCRIPTION   ; *********************
                6
                7           ; THIS IS A GENERAL, PURPOSE, RE-LOCATABLE MODULE FOR
                8           ; INTERFACING BETWEEN THE MAIN PROGRAM AND THE
                9           ; LOW SPEED RECEIVER PC BOARD(S). IT IS APPLICABLE FOR
               10           ; RX PCB'S SIMILIAR TO THE 226P372 (I/O)/226P400 (RX)
               11
               12           ; IT IS SELF-CONTAINED, AND ONLY REQUIRES:
               13           ;    - TO BE CALLED AT A 72 HZ RATE.
               14
               15           ; THIS MODULE WILL DECODE ANY 6 BIT COMMA FREE CODE
               16           ;    PRESENTED TO THE 226P400 PCB.  IT IS EXPECTED
               17           ;    THAT THE USER'S MAIN PROGRAM WILL COMPARE TO
               18           ;    SEE IF CODE IS VALID.
               19
               20           ; THIS MODULE HAS THE CAPABILITY TO DECODE 7 OR
               21           ;    8 BIT COMMA FREE CODES ALSO BY EXPANDING
               22           ;    THE ALGORITHM IN SECTION MSB0:.
               23
               24
               25           ; THIS MODULE SCANS THE I/O PCB TO OBTAIN THE
               26           ; RX DATA, AT PORTS DEFINED BY THE USER.
               27
               28           ; THE OUTPUT OF THIS MODULE CONSISTS OF(FOR EACH RX):
               29           ;    - A "1" OR "0" FOR EACH RX TO INDICATE
               30           ;        THE CURRENT DECODED BIT.
               31
               32           ;    - THE CURRENT DECODED WORD FOR EACH RX,
               33           ;        EXPRESSED AS THE LOWEST NUMERICAL
               34           ;        VALUE FOR THE DECODED WORD.
               35           ;        THIS ALLOWS A CONSISTENT WORD
               36           ;        CONTENT TO BE DISPLAYED .
               37           ;        (EVEN THOUGH BIT PATTERN CHANGES)
               38
               39           ;    - THE TIME FOR EACH RX, IN 55 MILLISECOND
               40           ;        INCREMENTS, THAT THE CODE HAS BEEN
               41           ;        CONTINUOUSLY PRESENT.
               42           ;        THIS VALUE IS RESET TO ZERO AT EACH CHANGE
               43           ;        OF CODE.
               44           ;        THE TIME VALUE WILL BE TRAPPED AT SOME
               45           ;        VALUE BETWEEN E0H AND F0H WHEN THE VALUE
               46           ;        EXCEEDS E0H.
               47           ;        THIS IS DONE TO AVOID OVERFLOWING THE
               48           ;        TIME VALUE LOCATION 8 BIT WORD CAPACITY.
               49
               50
               51           ; ***********************************************
               52
               53           ; RXDVD - RECEIVER PC BOARD DRIVER ROUTINE
               54
               55           ; ***********************************************
               56
               57
               58           ; REVISION 01, AUG. 01, 1982
               59
               60
0B00           61           RXDVD    EQU    0B00H       ; ROM MEMORY START ADDR
3600           62           DATRX1   EQU    3600H       ; RAM MEMORY START ADDR
3620           63           LEDRX1   EQU    DATRX1+20H  ; LED INDICATOR RX 1
3640           64           SMPCT1   EQU    DATRX1+40H  ; SAMPLE COUNTER RX1
3650           65           SMPRX1   EQU    DATRX1+50H  ; SAMPLE VALUE RX 1
3660           66           BITRX1   EQU    DATRX1+60H  ; SAMPLE SUM RX 1
```

```
3670         67        WRDRX1   EQU    DATRX1+70H  ;DECODED WORD RX 1
3630         68        CTR72H   EQU    DATRX1+30H  ;72 HX COUNTER
3631         69        PCBCTR   EQU    DATRX1+31H  ;PCB COUNTER
3632         70        RXCTR1   EQU    DATRX1+32H  ;RECEIVER COUNT R
3635         71        NEWSMP   EQU    DATRX1+35H  ;CURRENT SAMPLE  BIT
0006         72        CODEBT   EQU    06H         ;# BITS, COMMA-FREE COD
0002         73        RXMAX    EQU    02H         ;# RX ON A PC BOARD
0004         74        PCBMAX   EQU    04H         ;# RX PCB IN EQUIP.
006F         75        RXNABL   EQU    6FH         ;ENABLE WORD VALUE
0090         76        RXCLK    EQU    90H         ;CLOCK WORD
             77                                    ;    PLAT 1 BERTH 1
0092         78        PORT1    EQU    92H         ;RX 1 I/O PCB PORT
0094         79        STROB1   EQU    94H         ;RX 1 ENABLE/CLOCK PORT
0002         80        WDBIT1   EQU    02H         ;RX 1 BIT LOC. IN WORD
             81                                    ;    PLAT 1 BERTH 2
0092         82        PORT2    EQU    92H         ;RX 2 I/O PCB PORT
0094         83        STROB2   EQU    94H         ;RX 2 ENABLE/CLOCK PORT
0001         84        WDBIT2   EQU    01H         ;RX 2 BIT LOC. IN WORD
             85                                    ;    PLAT 2 BERTH 1
0090         86        PORT3    EQU    90H         ;RX 3 I/O PCB PORT
0094         87        STROB3   EQU    94H         ;RX 3 ENABLE/CLOCK PORT
0002         88        WDBIT3   EQU    02H         ;RX 3 BIT LOC. IN WORD
             89                                    ;    PLAT 2 BERTH 2
0090         90        PORT4    EQU    90H         ;RX 4 I/O PCB PORT
0094         91        STROB4   EQU    94H         ;RX 4 ENABLE/CLOCK PORT
0001         92        WDBIT4   EQU    01H         ;RX 4 BIT LOC. IN WORD
             93
             94                                    ;    PLAT 3 BERTH 1
009A         95        PORT5    EQU    9AH
009C         96        STROB5   EQU    9CH
0002         97        WDBIT5   EQU    02H
             98
             99                                    ;    PLAT 3 BERTH 2
009A        100        PORT6    EQU    9AH
009C        101        STROB6   EQU    9CH
0001        102        WDBIT6   EQU    01H
            103                                    ;    PLAT 4 BERTH 1
0098        104        PORT7    EQU    98H
009C        105        STROB7   EQU    9CH
0002        106        WDBIT7   EQU    02H
            107
            108                                    ;    PLAT 4 BERTH 2
0098        109        PORT8    EQU    98H
009C        110        STROB8   EQU    9CH
0001        111        WDBIT8   EQU    01H
            112
0B00        113        ORG      RXDVD   ;ROM START ADDR.
            114
            115        ;*** INCREMENT 72 HZ COUNTER ***
            116
0B00 3A3036 117        LDA      CTR72H  ;72 HZ COUNTER (0 TO 3)
0B03 3C     118        INR      A       ;INCREMENT COUNTER
0B04 FE04   119        CPI      04H     ;COMPARE TO MAX. COUNT
0B06 C20A0B 120        JNZ      NOFOUR  ;JUMP IF COUNT NOT=4
            121
0B09 AF     122        XRA      A       ;PUT ZERO IN COUNTER
0B0A 323036 123 NOFOUR: STA     CTR72H  ;UPDATE 72 HZ COUNTER
            124
            125        ;*** PREPARE REGISTERS FOR READING INPUT RX DATA
            126
0B0D 3E04   127        MVI      A,PCBMAX ;# PCB IN EQUIP
0B0F 323136 128        STA      PCBCTR   ;STORE PCB MAX IN ADDR. PCBCTR
0B12 016036 129        LXI      B,BITRX1 ;DECODED SAMPLE BIT #1
0B15 115036 130        LXI      D,SMPRX1 ;SAMPLE SUM VALUE RX #1
0B18 214036 131        LXI      H,SMPCT1 ;SAMPLE COUNTER #1
            132
            133        ;*** STROBE AND READ ALL INPUT RX DATA ***
            134
            135
0B1B 3E6F   136        MVI      A,RXNABL ;I/O PORT ENABLE WORD
0B1D D394   137        OUT      STROB1   ;OUTPUT ENABLE WORD
```

```
0B1F 3E90      138        MVI    A,RXCLK    ;CLOCK WORD
0B21 D394      139        OUT    STROB1     ;OUTPUT CLOCK WORD
0B23 DB92      140        IN     PORT1      ;INPUT RX DATA WORD
0B25 2F        141        CMA               ;COMPLIMENT
0B26 E602      142        ANI    WDBIT1     ;MASK FOR DATA BIT
0B28 CDBC0B    143        CALL   SAMPLE     ;SUB-ROUTINE
               144
0B2B 3E6F      145        MVI    A,RXNABL   ;I/O PORT ENABLE WORD
0B2D D394      146        OUT    STROB2     ;OUTPUT ENABLE WORD
0B2F 3E90      147        MVI    A,RXCLK    ;I/O PORT CLOCK WORD
0B31 D394      148        OUT    STROB2     ;OUTPUT CLOCK WORD
0B33 DB92      149        IN     PORT2      ;INPUT RX DATA WORD
0B35 2F        150        CMA               ;COMPLIMENT
0B36 E601      151        ANI    WDBIT2     ;MASK FOR DATA BIT
0B38 CDBC0B    152        CALL   SAMPLE     ;SUB-ROUTINE
0B3B 3A3136    153        LDA    PCBCTR     ;# PCB IN EQUIP.
0B3E 3D        154        DCR    A          ;DECREMENT PCBCTR
0B3F 323136    155        STA    PCBCTR     ;UPDATE PCB COUNTER
0B42 CAFD0B    156        JZ     SMPSUM     ;JUMP IF LAST PCB
               157
0B45 3E6F      158        MVI    A,RXNABL   ;I/O PORT ENABLE WORD
0B47 D394      159        OUT    STROB3     ;OUTPUT ENABLE WORD
0B49 3E90      160        MVI    A,RXCLK    ;I/O PORT CLOCK WORD
0B4B D394      161        OUT    STROB3     ;OUTPUT CLOCK WORD
0B4D DB90      162        IN     PORT3      ;INPUT RX DATA WORD
0B4F 2F        163        CMA               ;COMPLIMENT
0B50 E602      164        ANI    WDBIT3     ;MASK FOR DATA BIT
0B52 CDBC0B    165        CALL   SAMPLE     ;SUB-ROUTINE
               166
0B55 3E6F      167        MVI    A,RXNABL   ;ENABLE WORD
0B57 D394      168        OUT    STROB4     ;OUTPUT ENABLE WORD
0B59 3E90      169        MVI    A,RXCLK    ;CLOCK WORD
0B5B D394      170        OUT    STROB4     ;OUTPUT CLOCK WORD
0B5D DB90      171        IN     PORT4      ;INPUT RX DATA WORD
0B5F 2F        172        CMA               ;COMPLIMENT
0B60 E601      173        ANI    WDBIT4     ;MASK FOR DATA BIT
0B62 CDBC0B    174        CALL   SAMPLE     ;SUB:ROUTINE
0B65 3A3136    175        LDA    PCBCTR     ;# PCB IN EQUIP
0B68 3D        176        DCR    A          ;DECREMENT PCB COUNT
0B69 323136    177        STA    PCBCTR     ;UPDATE PCBCTR
0B6C CAFD0B    178        JZ     SMPSUM     ;JUMP IF LAST PCB
               179
0B6F 3E6F      180        MVI    A,RXNABL   ;ENABLE WORD
0B71 D39C      181        OUT    STROB5     ;OUTPUT ENABLE WORD
0B73 3E90      182        MVI    A,RXCLK    ;CLOCK WORD
0B75 D39C      183        OUT    STROB5     ;OUTPUT CLOCK WORD
0B77 DB9A      184        IN     PORT5      ;INPUT RX DATA WORD
0B79 2F        185        CMA               ;COMPLIMENT
0B7A E602      186        ANI    WDBIT5     ;MASK FOR RX DATA BIT
0B7C CDBC0B    187        CALL   SAMPLE     ;SUB-ROUTINE
               188
0B7F 3E6F      189        MVI    A,RXNABL   ;I/O PORT ENABLE WD
0B81 D39C      190        OUT    STROB6     ;OUTPUT ENABLE WORD
0B83 3E90      191        MVI    A,RXCLK    ;CLOCK WORD
0B85 D39C      192        OUT    STROB6     ;OUTPUT CLOCK WORD
0B87 DB9A      193        IN     PORT6      ;INPUT RX 6 DATA
0B89 2F        194        CMA               ;COMPLIMENT
0B8A E601      195        ANI    WDBIT6     ;MASK FOR DATA BIT
0B8C CDBC0B    196        CALL   SAMPLE     ;SUB-ROUTINE
0B8F 3A3136    197        LDA    PCBCTR     ;# PCB IN EQUIP.
0B92 3D        198        DCR    A          ;DECREMENT # PCB
0B93 323136    199        STA    PCBCTR     ;UPDATE PCBCTR
0B96 CAFD0B    200        JZ     SMPSUM     ;JUMP IF LAST PCB
               201
0B99 3E6F      202        MVI    A,RXNABL   ;I/O PORT ENABLE WD
0B9B D39C      203        OUT    STROB7     ;OUTPUT ENABLE WORD
0B9D 3E90      204        MVI    A,RXCLK    ;CLOCK WORD
0B9F D39C      205        OUT    STROB7     ;OUTPUT CLOCK WORD
0BA1 DB98      206        IN     PORT7      ;INPUT RX 7 DATA
0BA3 2F        207        CMA               ;COMPLIMENT
0BA4 E602      208        ANI    WDBIT7     ;MASK FOR DATA BIT
0BA6 CDBC0B    209        CALL   SAMPLE     ;SUB-ROUTINE
```

```
                                  15                                           16
                     210
0BA9  3E6F           211           MVI     A,RXNABL  ;I/O PORT ENABLE WD
0BAB  D39C           212           OUT     STROB8    ;OUTPUT ENABLE WORD
0BAD  3E90           213           MVI     A,RXCLK   ;CLOCK WORD
0BAF  D398           214           OUT     PORT8     ;OUTPUT CLOCK WORD
0BB1  DB98           215           IN      PORT8     ;INPUT RX 8 DATA
0BB3  2F             216           CMA               ;COMPLIMENT
0BB4  E601           217           ANI     WDBIT8    ;MASK FOR DATA BIT
0BB6  CDBC0B         218           CALL    SAMPLE    ;SUB-ROUTINE
0BB9  C3FD0B         219           JMP     SMPSUM
                     220
                     221           ;*** SUB-ROUTINE FOR RX DATA BIT DECODE & STORE
                     222
                     223
0BBC  00             224  SAMPLE   NOP
0BBD  323536         225           STA     NEWSMP    ;TEMP  STORE NEW SAMPLE BIT
0BC0  34             226           INR     M         ;INCREMENT SAMPLE COUNT
0BC1  7E             227           MOV     A,M       ;PUT SAMP  COUNT IN ACC
0BC2  FE04           228           CPI     04H       ;# OF SAMPLES IN BIT
0BC4  C2E30B         229           JNZ     FOURCT    ;JUMP IF NOT 4TH & LAST COUNT
                     230
                     231           ;*** DECODING SAMPLE AND LED OUTPUT ***
                     232
0BC7  7D             233           MOV     A,L       ;PUT LSB IN ACC
0BC8  DE20           234           SBI     20H       ;SET UP FOR LED ADDR
0BCA  6F             235           MOV     L,A       ;POINT TO LED ADDR
0BCB  1A             236           LDAX    D         ;PUT SAMPLE SUM IN ACC
0BCC  FE02           237           CPI     02H       ;DECISION FOR 1 OR ZERO BIT
0BCE  3E01           238           MVI     A,01H     ;(SHOULD NOT AFFECT FLAGS?)
0BD0  D2D50B         239           JNC     LED1      ;JUMP IF "1" BIT(2 OR >)
                     240
0BD3  3E00           241           MVI     A,00H     ;PUT ZERO IN ACC
0BD5  77             242  LED1     MOV     M,A       ;OUTPUT FOR LED
                     243
                     244           ;*** STORE TAGGED DECODED RX SAMPLE ***
                     245
0BD6  C680           246           ADI     80H       ;TAG VALUE
0BD8  02             247           STAX    B         ;STORE DECODED TAGGED BIT
0BD9  7D             248           MOV     A,L       ;PUT LSB IN ACC
0BDA  C620           249           ADI     20H       ;SET UP FOR ORIGINAL ADDR
0BDC  6F             250           MOV     L,A       ;POINT TO SAMPLE COUNTER
0BDD  AF             251           XRA     A         ;PUT ZERO IN ACC
0BDE  77             252           MOV     M,A       ;ZERO SAMPLE COUNTER
0BDF  12             253           STAX    D         ;ZERO SAMPLE SUM
0BE0  C3F70B         254           JMP     SMPEND
                     255
                     256           ;*** END OF DECODING SAMPLE AND LED OUTPUT ***
                     257
                     258
0BE3  3A3536         259  FOURCT   LDA     NEWSMP    ;PUT NEW SAMPLE BIT IN ACC
0BE6  FE00           260           CPI     00H
0BE8  CAF70B         261           JZ      SMPEND    ;JUMP IF ZERO "0"
                     262
                     263
0BEB  1A             264           LDAX    D         ;PUT SAMPLE IN ACC
0BEC  FE00           265           CPI     00H
0BEE  C2F30B         266           JNZ     SAMP1     ;JUMP IF NOT 1ST "1"
                     267
0BF1  3601           268           MVI     M,01H     ;RESET COUNTER TO 1
0BF3  1A             269  SAMP1    LDAX    D         ;PUT SAMPLE SUM IN ACC
0BF4  C601           270           ADI     01H       ;ADD 1
0BF6  12             271           STAX    D         ;UPDATE SAMPLE SUM
0BF7  23             272  SMPEND   INX     H         ;INCREMENT SAMPLE SUM ADDR
0BF8  13             273           INX     D         ;INCREMENT SAMPLE VALUE ADDR
0BF9  03             274           INX     B         ;INCREMENT DECODED RX ADDR
0BFA  C9             275           RET               ;RETURN
0BFB  00             276           NOP
0BFC  00             277           NOP
                     278
                     279
                     280           ;*** INITIALIZE ADDRESSES IN REGISTERS ***
                     281
```

```
0BFD  00           282  SMPSUM: NOP
0BFE  117036       283          LXI    D,WRDRX1   ;DECODED WORD #1
0C01  216036       284          LXI    H,BITRX1   ;DECODED SAMPLE BIT #1
0C04  3A3036       285          LDA    CTR72H     ;0 TO 3 COUNTER
0C07  07           286          RLC               ;MULTIPLY COUNT BY 2
0C08  47           287          MOV    B,A        ;STORE ADDR. OFFSET IN B REG
0C09  3E02         288          MVI    A,RXMAX    ;# RX ON A PCB
0C0B  323236       289          STA    RXCTR1     ;RXMAX DOWN COUNTER ADDR.
                   290
                   291          ;*** OFFSET ADDRESSES IN REGISTERS ***
                   292
0C0E  7D           293          MOV    A,L        ;PUT LSB IN ACC
0C0F  80           294          ADD    B          ;ADD ADDRESS OFFSET
0C10  6F           295          MOV    L,A        ;UPDATE SUM ADDRESS
0C11  7B           296          MOV    A,E        ;PUT LSB IN ACC
0C12  80           297          ADD    B          ;ADD ADDRESS OFFSET
0C13  5F           298          MOV    E,A        ;UPDATE DECODED WD ADDR.
                   299
                   300          ;*** EACH TIME THRU THIS PROGRAM THE BOTH RX ON
                   301          ;*** ONE OF THE FOUR PCB WILL BE PROCESSED *
                   302
                   303          ;*** LOOP FOR PROCESSING RX BIT INTO RX WORD ***
                   304
0C14  00           305  LOOPWD: NOP
                   306
                   307          ;*** SEE IF DECODED SAMPLE IS READY(TAGGED 80H)
                   308
0C15  7E           309          MOV    A,M        ;PUT DECODED SAMPLE BIT IN ACC
0C16  E680         310          ANI    80H        ;MASK, LEAVE ONLY MSB
0C18  FE80         311          CPI    80H        ;80H = SAMPLE COMPLETE
0C1A  C22E0D       312          JNZ    NEXTRX     ;JUMP IF SAMPLE NOT DONE
                   313
0C1D  7E           314          MOV    A,M        ;BRING BACK DECODED SAMPLE BIT
0C1E  E67F         315          ANI    7FH        ;REMOVE TAG
0C20  77           316          MOV    M,A        ;PUT DECODED SAMPLE BACK IN MEM.
                   317
                   318          ;*** DETERMINE CODE SIZE ***
                   319
0C21  3E06         320          MVI    A,CODEBT   ;COMMA-FREE CODE SIZE
0C23  FE06         321          CPI    06H        ;6 BIT CODE
0C25  C23A0C       322          JNZ    SEVEN      ;JUMP IF NOT 6 BIT
                   323
0C28  1A           324          LDAX   D          ;DECODED WORD
0C29  E61F         325          ANI    1FH        ;ZERO 3 MSB
0C2B  07           326          RLC               ;MOVE LEFT W/ZERO LSB
0C2C  B6           327          ORA    M          ;OR WITH RX BIT
0C2D  12           328          STAX   D          ;UPDATE RX WORD
0C2E  4F           329          MOV    C,A        ;STORE WORD IN C REG
0C2F  CA090D       330          JZ     OUTPT      ;JUMP IF ALL "0"
                   331
0C32  FE3F         332          CPI    3FH        ;ALL "1"
0C34  CA090D       333          JZ     OUTPT      ;JUMP IF ALL "1"
                   334
0C37  C3610C       335          JMP    SOMEWD
0C3A  FE07         336  SEVEN:  CPI    07H        ;7 BIT CODE
0C3C  C2520C       337          JNZ    EIGHT      ;JUMP IF NOT 7 BIT CODE
                   338
0C3F  1A           339          LDAX   D          ;DECODED WORD
0C40  E63F         340          ANI    3FH        ;ZERO 2 MSB
0C42  07           341          RLC               ;MOVE LEFT W/ZERO LSB
0C43  B6           342          ORA    M          ;OR WITH RX BIT
0C44  12           343          STAX   D          ;UPDATE RX WORD
0C45  4F           344          MOV    C,A        ;STORE WORD IN C REG
0C46  CA090D       345          JZ     OUTPT      ;JUMP IF ALL "0"
                   346
0C49  FE7F         347          CPI    7FH        ;ALL "1"
0C4B  4F           348          MOV    C,A        ;STORE WORD IN C REG
0C4C  CA090D       349          JZ     OUTPT      ;JUMP IF ALL "1"
                   350
0C4F  C3610C       351          JMP    SOMEWD
                   352
```

```
0C52  1A      353 EIGHT:  LDAX  D          ;DECODED WORD
0C53  E67F    354         ANI   7FH        ;ZERO 1 MSB
0C55  07      355         RLC              ;MOVE LEFT W/ZERO LSB
0C56  B6      356         ORA   M          ;OR WITH RX BIT
0C57  12      357         STAX  D          ;UPDATE DECODED WORD
0C58  4F      358         MOV   C,A        ;STORE BIT IN C REG.
0C59  CA090D  359         JZ    OUTPT      ;JUMP IF ALL "0"
              360
0C5C  FEFF    361         CPI   0FFH       ;ALL "1"
0C5E  CA090D  362         JZ    OUTPT      ;JUMP IF ALL "1"
              363
              364
              365                 ;*** ROTATE NEWLY DECODED WORD SO OUTPUT CAN
              366                 ;*** BE CONSISTENTLY PRESENTED AS
              367                 ;*** LOWEST EXPRESSION OF RECEIVED CODE ***
              368
              369
0C61  00      370 SOMEWD. NOP
0C62  3E06    371         MVI   A,CODEBT   ;COMMA FREE CODE SIZE
0C64  FE06    372         CPI   06H        ;6 BIT CODE
0C66  C2080D  373         JNZ   SVEN7      ;JUMP IF NOT 6 BIT
              374
0C69  79      375 LSB1:   MOV   A,C        ;PUT RX WORD IN ACC
0C6A  E601    376         ANI   01H        ;MASK ALL BUT LSB
0C6C  FE01    377         CPI   01H        ;IS LSB NON-ZERO
0C6E  CA770C  378         JZ    CODE01     ;JUMP IF NON-ZERO
              379
0C71  79      380         MOV   A,C        ;BRING BACK RX WORD
0C72  0F      381         RRC              ;ROTATE RIGHT-PUT 0 IN MSB
0C73  4F      382         MOV   C,A        ;UPDATE RX WORD
0C74  C3690C  383         JMP   LSB1       ;LOOP UNTIL LSB=1
              384
0C77  79      385 CODE01: MOV   A,C        ;PUT RX WORD IN ACC
0C78  FE01    386         CPI   01H        ;100000 CODE
0C7A  CA090D  387         JZ    OUTPT      ;JUMP IF 100000 CODE
              388
0C7D  FE15    389 CODE15: CPI   15H        ;101010 CODE
0C7F  CA090D  390         JZ    OUTPT      ;JUMP IF 101010 CODE
              391
0C82  E620    392 MSB0:   ANI   20H        ;MASK ALL BUT MSB OF RX WORD
0C84  FE00    393         CPI   00H        ;IS IT ZERO
0C86  CA930C  394         JZ    CNT1       ;JUMP IF MSB OF RX WD =0
              395
0C89  79      396         MOV   A,C        ;PUT RX WORD IN ACC
0C8A  07      397         RLC              ;ROTATE LEFT PUT 0 IN MSB
0C8B  F601    398         ORI   01H        ;PUT NON-ZERO IN LSB
0C8D  E63F    399         ANI   3FH        ;ZERO ALL BUT 6 BIT CODE
0C8F  4F      400         MOV   C,A        ;UPDATE C REG
0C90  C3820C  401         JMP   MSB0       ;LOOP UNTIL MSB=0 RX WORD
              402
0C93  00      403 CNT1:   NOP
0C94  3601    404         MVI   M,01H      ;INITIALIZE FOR LSB=1
0C96  79      405         MOV   A,C        ;PUT RT.ADJ.WD IN ACC
0C97  0F      406         RRC              ;MOVE TO REMOVE LSB
0C98  0F      407         RRC              ;2ND LSB TO SET CARRY FLAG
0C99  D29D0C  408         JNC   LSB3       ;JUMP IF LSB=0
              409
0C9C  34      410         INR   M          ;INCREMENT 1'S COUNT OF RX WD
              411
0C9D  0F      412 LSB3:   RRC              ;3RD LSB TO SET CARRY FLAG
0C9E  D2A20C  413         JNC   LSB4       ;JUMP IF 3RD LSB=0
              414
0CA1  34      415         INR   M          ;INCREMENT 1'S COUNT
              416
0CA2  0F      417 LSB4:   RRC              ;4TH LSB TO SET CARRY FLAG
0CA3  D2A70C  418         JNC   LSB5       ;JUMP IF 4TH LSB=0
              419
0CA6  34      420         INR   M          ;INCREMENT 1'S COUNT
              421
0CA7  0F      422 LSB5:   RRC              ;5TH LSB TO SET CARRY FLAG
0CA8  D2AC0C  423         JNC   LSB6       ;JUMP IF 5TH LSB =0
              424
```

```
0CAB 34            425            INR    M           ;INCREMENT 1'S COUNTER
                   426
0CAC 00            427 LSB6:  NOP                    ;ALREADY DEFINED AS ZERO
                   428
0CAD 7E            429            MOV    A,M         ;PUT 1'S COUNT IN ACC
0CAE FE05          430            CPI    05H         ;111110 CODE
0CB0 C2B80C        431            JNZ    CNT4        ;JUMP IF NOT THIS CODE
                   432
0CB3 0E1F          433            MVI    C,1FH       ;UPDATE C REG
0CB5 C3090D        434            JMP    OUTPT
                   435
0CB8 FE04          436 CNT4:  CPI    04H         ;111100 CODE OR 111010 CODE
0CBA C2CD0C        437            JNZ    CNT3        ;JUMP IF NOT 4 ONES
                   438
0CBD 79            439            MOV    A,C         ;PUT RT ADJ. IN ACC
0CBE FE0F          440            CPI    0FH         ;111100 CODE
0CC0 C2C80C        441            JNZ    CNT4A       ;JUMP IF NOT 111100
                   442
0CC3 0E0F          443            MVI    C,0FH       ;UPDATE C REG
0CC5 C3090D        444            JMP    OUTPT
                   445
0CC8 0E17          446 CNT4A: MVI    C,17H       ;UPDATE C REG
0CCA C3090D        447            JMP    OUTPT
                   448
0CCD FE03          449 CNT3:  CPI    03H         ;111000,110100,110010 CODE
0CCF C2F10C        450            JNZ    CNT2        ;JUMP IF NOT 3 ONES
                   451
0CD2 79            452            MOV    A,C         ;PUT RX WORD IN ACC
0CD3 FE07          453            CPI    07H         ;111000 CODE
0CD5 C2DD0C        454            JNZ    CNT3A       ;JUMP IF NOT 111000 CODE
                   455
0CD8 0E07          456            MVI    C,07H       ;UPDATE C REG
0CDA C3090D        457            JMP    OUTPT
                   458
0CDD FE0B          459 CNT3A: CPI    0BH         ;110100 CODE
0CDF CAE70C        460            JZ     CNT3B       ;JUMP IF 110100 CODE
                   461
0CE2 FE19          462            CPI    19H         ;100110 CODE VARIATION
0CE4 C2EC0C        463            JNZ    CNT3C       ;JUMP IF NOT 19H
                   464
0CE7 0E0B          465 CNT3B: MVI    C,0BH       ;UPDATE C REG
0CE9 C3090D        466            JMP    OUTPT
                   467
0CEC 0E13          468 CNT3C: MVI    C,13H       ;110010 CODE UPDATE
0CEE C3090D        469            JMP    OUTPT
                   470
                   471
0CF1 79            472 CNT2:  MOV    A,C         ;PUT RX WD IN ACC
0CF2 FE03          473            CPI    03H         ;110000 CODE
0CF4 C2FC0C        474            JNZ    CNT2A       ;JUMP IF NOT 03H CODE
                   475
0CF7 0E03          476            MVI    C,03H       ;UPDATE C REG
0CF9 C3090D        477            JMP    OUTPT
                   478
0CFC FE09          479 CNT2A: CPI    09H         ;100100 CODE
0CFE C2060D        480            JNZ    CNT2B       ;JUMP IF NOT 100100 CODE
                   481
0D01 0E09          482            MVI    C,09H       ;UPDATE C REG
0D03 C3090D        483            JMP    OUTPT
                   484
0D06 0E05          485 CNT2B: MVI    C,05H       ;UPDATE C REG WITH 05H
                   486                                ;NOTE 05H IS SAME AS 11H
                   487
0D08 00            488 SVEN7  NOP                    ;TO BE ADDED IN FUTURE
                   489
                   490
0D09 7D            491 OUTPT: MOV    A,L         ;PUT LSB OF ADDR. IN ACC
0D0A D660          492            SUI    60H         ;SET UP TO CHANGE ADDR
0D0C 6F            493            MOV    L,A         ;POINT TO RX WORD OUTPUT
```

```
0D0D 7E      494
             495          MOV   A,M      ;OLD OUTPUT IN ACC
0D0E B9      496          CMP   C        ;COMPARE TO NEW WORD
0D0F CA1C0D  497          JZ    SAME     ;JUMP IF SAME WORD
             498
0D12 71      499          MOV   M,C      ;OUTPUT NEW WORD
0D13 7D      500          MOV   A,L      ;CHANGE H&L TO POINT
0D14 C610    501          ADI   10H      ; TO LENGTH OF TIME
0D16 6F      502          MOV   L,A      ; THIS WORD PRESENT
0D17 AF      503          XRA   A        ;PUT ZERO IN ACC
0D18 77      504          MOV   M,A      ;OUTPUT ZERO TIME VALUE
0D19 C3290D  505          JMP   SKIP1
             506
0D1C 7D      507 SAME:    MOV   A,L      ;POINT H&L TO
0D1D C610    508          ADI   10H      ;LENGTH OF TIME
0D1F 6F      509          MOV   L,A      ; THIS WORD PRESENT
0D20 34      510          INR   M        ;INCREMENT TIME VALUE
0D21 7E      511          MOV   A,M      ;PUT TIME IN ACC
0D22 FEED    512          CPI   0EDH     ;UPPER LIMIT, ARTIFICIAL
0D24 DA290D  513          JC    SKIP1    ;JUMP IF LESS THAN 0EFH
             514
0D27 36E0    515          MVI   M,0E0H   ;TO AVOID RESET TO ZERO
0D29 00      516 SKIP1:   NOP
0D2A 7D      517          MOV   A,L      ;PUT LBS ADDR. IN ACC
0D2B C650    518          ADI   50H      ;OFFSET FOR ORIGINAL ADDR.
0D2D 6F      519          MOV   L,A      ;POINT TO NEXT DECODED BIT
0D2E 13      520 NEXTRX:  INX   D        ;INCREMENT TO NEXT DECODED WD
0D2F 23      521          INX   H        ;INCREMENT TO NEXT DECODED BIT
0D30 3A3236  522          LDA   RXCTR1
0D33 3D      523          DCR   A        ;DECREMENT # RX OF RX ON PCB
0D34 323236  524          STA   RXCTR1   ;STORE UPDATED COUNTER
0D37 C2140C  525          JNZ   LOOPWD   ;IF # RX NOT 0 DO LOOP AGAIN
             526                         ;(LOOP TWICE EACH TIME CALLED)
             527
             528
0D3A C9      529          RET
             530
0B00         531          END   RXDVD
```

PUBLIC SYMBOLS

EXTERNAL SYMBOLS

USER SYMBOLS
```
BITRX1  A 3660    CNT1    A 0C93    CNT2    A 0CF1    CNT2A   A 0CFC
CNT2B   A 0D06    CNT3    A 0CCD    CNT3A   A 0CDD    CNT3B   A 0CE7
CNT3C   A 0CEC    CNT4    A 0CB8    CNT4A   A 0CC8    CODE01  A 0C77
CODE15  A 0C7D    CODE8T  A 0006    CTR72H  A 3630    DATRX1  A 3600
EIGHT   A 0C52    FOURCT  A 0BE3    LED1    A 0BD5    LEDRX1  A 3620
LOOPWD  A 0C14    LSB1    A 0C69    LSB3    A 0C9D    LSB4    A 0CA2
LSB5    A 0CA7    LSB6    A 0CAC    MSB0    A 0C82    NEWSMP  A 3635
NEXTRX  A 0D2E    NOFOUR  A 0B0A    OUTPT   A 0D09    PCBCTR  A 3631
PCBMAX  A 0004    PORT1   A 0092    PORT2   A 0092    PORT3   A 0090
PORT4   A 0090    PORT5   A 009A    PORT6   A 009A    PORT7   A 0098
PORT8   A 0098    RXCLK   A 0090    RXCTR1  A 3632    RXDVD   A 0B00
RXMAX   A 0002    RXNABL  A 006F    SAME    A 0D1C    SAMP1   A 0BF3
SAMPLE  A 0BBC    SEVEN   A 0C3A    SKIP1   A 0D29    SMPCT1  A 3640
SMPEND  A 0BF7    SMPRX1  A 3650    SMPSUM  A 0BFD    SOMEWD  A 0C61
STROB1  A 0094    STROB2  A 0094    STROB3  A 0094    STROB4  A 0094
STROB5  A 009C    STROB6  A 009C    STROB7  A 009C    STROB8  A 009C
SVEN7   A 0D08    WDBIT1  A 0002    WDBIT2  A 0001    WDBIT3  A 0002
WDBIT4  A 0001    WDBIT5  A 0002    WDBIT6  A 0001    WDBIT7  A 0002
WDBIT8  A 0001    WRDRX1  A 3670
```

What we claim is:

1. In apparatus for decoding an input signal word having a plurality of bits and a known transmission rate, said signal word including first and second coded message frequencies, the combination of
   means for filtering and detecting a first message frequency signal having one of a high and low value in accordance with each bit of the comma free code of said first frequency,
   means for filtering and detecting a second message frequency signal having one of a high and low value in accordance with each bit of the comma free code of said second frequency,
   means providing a bit of a third signal for each bit of the first and second message frequency signals,
   means for sampling each said bit of the third signal at a sampling rate that is a selected non-unity multiple of said transmission rate to provide a sample set for each bit of the third signal consisting of an odd plurality of samples,
   means for determining the binary value of each bit of the third signal in accordance with the sum of the odd plurality of samples being greater than a predetermined number, and
   means for establishing the binary value for all of the plurality of bits of the input signal word.

2. The signal decoding apparatus of claim 1, with said determining means being operative to determine if the sum of said samples in each sample set is equal to or greater than said odd plurality of samples minus one.

3. The signal decoding apparatus of claim 1, with the sampling means initially providing more than one desired number of samples in the sample set for each bit of the third signal and with the determining means then being operative to not consider at least one of those samples such that a desired odd plurality of samples is thereby provided.

4. The signal decoding apparatus of claim 1, with said determining means being operative to determine the binary value of each bit of the third signal in accordance with the sum being at least a majority of said odd plurality of samples.

5. The signal decoding apparatus of claim 1, including means for resetting a given sample set in relation to said sampling rate when the first, second or third sample in said sample set indicates a ONE value and the sum of the previous samples taken for that sample set is ZERO.

6. A process for decoding an input signal word having a plurality of bits and a known transmission rate, with said signal word having first and second coded message frequencies, including the steps of:
   providing a first signal having one of a ONE or a ZERO value bit in accordance with each bit of the first frequency,
   providing a second signal having one of a ONE or a ZERO value bit in accordance with each bit of the second frequency,
   providing a third signal having a ONE value bit for each ONE value bit of the first signal and having a ZERO value bit for each ONE value bit of the second signal,
   sampling each bit of the third signal at a sampling rate that is a predetermined non-unity multiple of said known transmission rate to provide at least an odd plurality of samples for each bit of the third signal,
   determining the binary value of each bit of the third signal in accordance with the sum of said odd plurality of samples being at least a majority of those samples, and
   establishing the binary value for all of the plurality of bits of the input signal word to decode said input signal word.

7. The input signal word decoding process of claim 6, with the sampling step being in accordance with more than said odd plurality of samples.

8. The input signal word decoding process of claim 6, with the sampling step initially providing more than said odd plurality of samples, and
   with the determining step being operative in accordance with the sum of said odd plurality of samples and in relation to a predetermined total number.

* * * * *